Aug. 12, 1958  D. R. DE BOISBLANC  2,847,643
DETECTING DEVICE
Filed April 9, 1951

INVENTOR.
D. R. DE BOISBLANC
BY Hudson & Young
ATTORNEYS

United States Patent Office 2,847,643
Patented Aug. 12, 1958

2,847,643

DETECTING DEVICE

Deslonde R. de Boisblanc, Bartlesville, Okla., assignor to Phillips Petroleum Company, a corporation of Delaware Application April 9, 1951, Serial No. 220,113

7 Claims. (Cl. 324—71)

This invention relates to a method of and apparatus for detecting chemical reactions. In another aspect it relates to flame detection apparatus. In still another aspect it relates to a method of measuring ionization.

For some time is generally has been known that there exists a random motion of electrical charges within any electrical conductor. This motion, called "thermal agitation," establishes spontaneous voltage fluctuations across the end terminals of the conductor; and it can be shown that the voltages set up as a result of this random motion of electrical charges are a function of the temperature of the conductor, its resistance and the frequency band width over which the voltage fluctuations are measured. This relationship is expressed mathematically by the Nyquist formula:

$$\bar{E}^2 = 4kTR\Delta f$$

where $\bar{E}^2$ equals the root-mean-square voltage fluctuations across the terminals of the conductor, $k$ is Boltzmann's gas constant, $T$ is a absolute temperature, $R$ is the resistance of the conductor and $\Delta f$ is the frequency band width over which the voltage fluctuations are measured. However, this relationship holds true only for a passive circuit, that is, one in which no non-thermal current flows through the conductor being measured. If the circuit is held completely passive, an unknown temperature can be measured by a procedure such as that disclosed in the copending application of R. S. Marsden, Jr., and D. R. De Boisblanc, Serial No. 220,115, filed April 9, 1951, now abandoned, based upon this thermal noise phenomenon.

If, on the other hand, any external source of current enters the circuit of the particular conductor being measured, the above mentioned relationship no longer holds since this external current creates a second electrical noise effect in the conductor which is not related directly to the temperature of the conductor. Common sources of error which must, therefore, be guarded against in using the above relationship in measuring temperature are the effect of thermionic emission from the conductor and the effect of external ions striking said conductor. It has been discovered that if external ions strike the conductor, the indicated signal no longer represents temperature, but rather has an amplitude many times that of the pure thermal noise signal. Thus, by measuring the electrical noise created by ions impinging upon the surface of a conductor it is possible to obtain an indication of the activity of the ions striking said conductor.

In any given resistance element having two electrodes connected thereto, one of which is grounded, there normally exists a constant distribution of potential at all points throughout said resistance element. If a charged particle is brought into contact with the surface of this resistance element a current flows in said element until all points therein are once again at zero or ground potential. During the time when current is flowing, that region of the resistance element in the neighborhood of the ungrounded electrode exhibits a potential variation which depends upon the magnitude of the charge of the particle striking said element, the resistance of the element, and the geometric relation of the ungrounded electrode with respect to the second grounded electrode. This potential variation is measured in accordance with the present invention to give an indication of the presence of ions produced by a chemical reaction, such as, for example, a combustion type reaction, or simply a flame.

It is, accordingly, an object of this invention to provide a method of detecting and recording the activity of an ion producing reaction.

Another object is to provide a method of flame detection.

A further object is to provide means for detecting and measuring ionization.

A still further object is to provide flame detecting apparatus which is positive in action, reliable in result, of durable construction, and which utilizes a simplified electrical circuit.

Various other objects, advantages and features of this invention will become apparent from the following detailed description taken in conjunction with the accompanying drawings in which.

Figure 1:
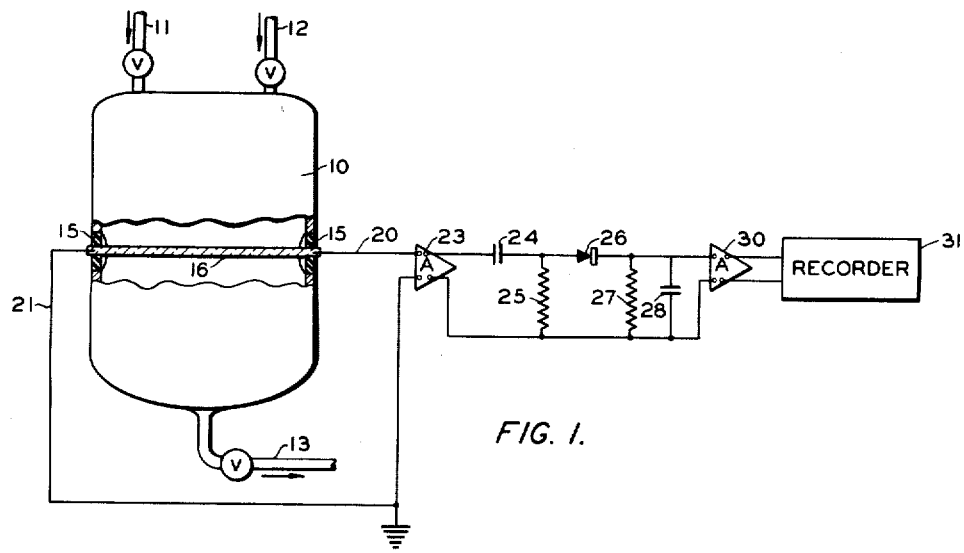
Figure 1 shows schematically appropriate electrical circuitry, which can be used to detect and record ionization in accordance with this invention.

Referring now to the drawings in detail and to Figure 1 in particular, there is shown a reaction chamber 10 supplied by two valved reactor conduits 11 and 12, and an outlet conduit 13. Positioned within reaction chamber 10 and electrically insulated from the walls of said chamber by means of suitable insulating seals 15 is an electrical noise resistance element 16. Element 16 preferably is constructed of some type of ceramic material, and can be of a form such as disclosed in the copending application by R. S. Marsden, Jr., Serial No. 220,116, filed April 9, 1951, now Patent No. 2,768,266. The use of a ceramic material as the sensing element is particularly desirable if the reaction being detected takes place at high temperature since ceramic materials are capable of withstanding considerably higher temperatures than ordinary metallic resistors. Electrical leads 20 and 21 are connected directly to the end terminals of resistor 16 and to the input of an alternating current amplifier 23, lead 21 being grounded. Amplifier 23 is any well known type of conventional wide frequency band pass alternating current amplifier having high gain. Connected in the output circuit of amplifier 23 is a filter capacitor 24 and resistor 25 which serve to eliminate low frequency pickup voltage such as 60 cycle inductively coupled signals which may be present in the circuit. The amplified signal is passed through rectifier 26, filtered by capacitor 28 and resistor 27, and applied to the input of direct current amplifier 30. The output of amplifier 30 is applied to a suitable direct current recording instrument shown at 31, such as for example, a pen recorder.

Let it be assumed that a chemical reaction, such as, for example, the chlorination of a hydrocarbon such as benzene, takes place within reaction chamber 10. A stream of chlorine enters chamber 10 through conduit 11, a stream of benzene enters through conduit 12, and the resulting chlorobenzene leaves through outlet 13. Ions produced by this reaction will bombard the surface of electrical noise resistance element 16 and so generate electrical noise voltage fluctuations across said element. Each ion that strikes element 16 introduces a small burst of current. The voltage fluctuations created across the end terminals of noise element 16 by the individual bursts of current will have a statistical fluctuation of magnitude over a wide frequency range, but must be greatly amplified by means of amplifier 23 before being capable of actuating recorder 31. Since on the average, the numbers of positive and negative ions striking element 16 will be equal, the average value of the current created thereby will be zero; although if this amplified signal is viewed on a cathode ray oscilloscope the positive and negative charges will appear as both positive and negative deflections on said oscilloscope. However, by passing the amplified signal through a non-linear element such as rectifier 26, it is possible to observe the effect of only the positive or negative ions striking element 16, and these can be averaged with respect to time. The rectified signal is amplified further by direct current amplifier 30, the output of which actuates recording instrument 31. Since the signal generated is proportional to the number of ions striking element 16 at any given time, by observing this amplified signal it is possible to obtain a quantitative measurement of the activity taking place in reaction chamber 10.

Figure 2:
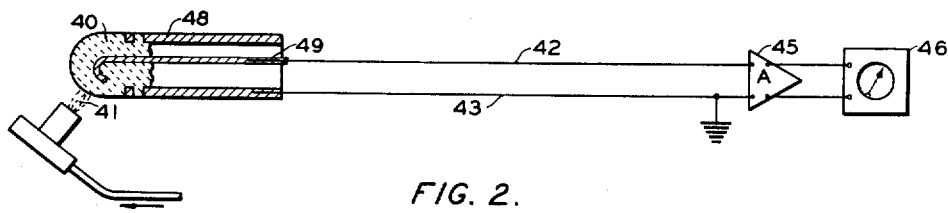
Figure 2 shows a simplified form of measuring apparatus particularly adapted to flame detection.

In Figure 2 there is shown a simplified form of the apparatus of Figure 1 which is particularly adapted to the detection of flames. An electrical noise sensing element in the form of a ceramic tipped probe 40 is positioned in a region in which a flame such as 41 is to be detected. This probe, which comprises a metallic casing 48 enclosing a metallic electrode 49 embedded in tip 40, is of the type described in greater detail and claimed in the aforementioned Marsden application. Electrical noise signals generated by flame 41 impinging upon ceramic tip 40 are transmitted by leads 42 and 43 connected to electrode 49 and casing 48, respectively, to the input of amplifier 45. The output of amplifier 45 is connected to a suitable indicating meter 46, which can be an alternating current voltmeter. In simplified form this signal can be detected directly by meter 46, although said amplified signal could actuate any of several known types of warning devices to indicate the presence of flame.

Figure 3:
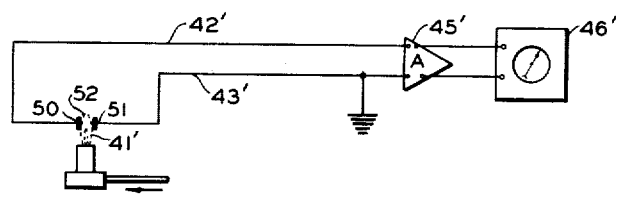
Figure 3 shows a second simplified form of measuring apparatus particularly adapted to flame detection.

A second form of simplified flame detector is illustrated in Figure 3. This circuit of Figure 3 is identical to that shown in Figure 2 except as to the particular noise detector; and similar circuit components are identified by like primed reference numerals. In Figure 3 the electrical noise flame detecting element is shown s comprising an ionization gap formed by opposing spaced electrodes 50 and 51. It has been discovered that an air gap 52 positioned between electrodes such as 50 and 51 is effective as an electrical noise generating element. In this case the flame being detected is directed between the opposing electrodes 50 and 51 and the resulting noise signal is taken across said electrodes.

It should be pointed out in connection with Figure 3 that the air gap used therein in no way is equivalent to the numerous ionization gages and flame detection apparatus known in the prior art which employ the principle of completing an electric circuit through an air gap by means of a conducting flame. In the various prior art devices an external source of voltage is applied across a normally non-conductive air gap, and any resulting conduction thereacross due to ionization within said air gap is detected by means of the completed electrical circuit. In the present invention no use is made of an external voltage source, rather the signal being detected comprises electrical noise voltage fluctuations established by the action of ions striking an electrical noise resistance element. In the use of the air gap, gas is considered as being the electrical noise resistance element.

It should be pointed out that successful operation of the flame detector of this invention does not depend upon any particular type of electrical noise resistance element. While a ceramic resistance material is particularly desirable for high temperature measurement (said material becoming electrically conductive at high temperatures), for many applications other types of electrical noise resistance elements such as metallic resistors are entirely satisfactory. It is of course desirable that the particular noise element used have as large a surface area as possible in order that a maximum number of the ions produced will strike said element. While preferred forms of electrical circuitry have been described in connection with this invention it should be apparent that satisfactory operation of the detector in no way depends upon the particular type of circuit employed. Since the voltage fluctuations generated across the noise element are of extremely small magnitude it is of course necessary that these fluctuations be amplified many fold before being of sufficient magnitude to be detected on known meters or recording instruments. For the same reason the particular amplifier used must be one in which very small amounts of thermal noise are introduced within said amplifier itself. Otherwise, the thermal noise introduced within the amplifier conceivably could override the signal being detected, resulting in a distorted or meaningless indication. In addition, the amplifier should be capable of transmitting signals over a wide frequency band in order that maximum voltage fluctuations be transmitted through said amplifier.

It should be apparent that there has been provided in accordance with this invention a simplified form of ionic reaction indicator particularly adapted to the detection of flames. In this respect excellent results have been obtained in detecting various hydrocarbon flames, although the invention is by no means limited to any particular flame. The same is true with respect to chemical reactions in general; any type of ion producing reaction can be detected. The apparatus employed measures electrical noise voltage fluctuations generated across an electrical noise element by ions striking said element. While the above description has been taken in conjunction with a preferred embodiment of this invention it should be apparent to those skilled in the art that various modifications can be resorted to without departing from the scope of this invention.

I claim:

1. Means for detecting an ion producing chemical reaction comprising, in combination, an electrically conductive ceramic resistance element adapted to be positioned directly within the region of the reaction to be detected so that charged particles in the reaction can impinge directly on the element, an amplifier adapted to pass fluctuating voltage signals, the input terminals of said amplifier being connected across said resistance element, and means connected to the output terminals of said amplifier to measure the electrical voltage fluctuations which are generated across said element by ions of said reaction impinging directly on said element.

2. Means for detecting an ion producing reaction comprising, in combination, an electrically conductive ceramic resistance element positioned directly within the region of the ions being produced, an alternating current amplifier, the input terminals of said amplifier being connected across said resistance element, and means connected to the output terminals of said amplifier to detect the electrical voltage fluctuations which are generated across said element by charged particles striking said element.

3. Means for detecting an ion producing reaction comprising, in combination, an electrically conductive ceramic resistance element adapted to be positioned within the region of the ions being produced, an alternating current amplifier, the input terminals of said amplifier being connected across said resistance element such that the input to said amplifier comprises electrical voltage fluctuations which are generated across said element by charged particles impinging thereon, rectifying means connected to the output terminals of said amplifier, second amplifying means connected to the output of said rectifying means, and means connected to the output of said second amplifying means for recording the amplified signal from said second amplifying means.

4. Flame detecting apparatus comprising, in combination, an electrically conductive ceramic resistance element adapted to be positioned directly in the region of a flame to be detected so that charged particles in the flame can impinge directly on the element, amplifying means having the input terminals thereof connected across said resistance element, said amplifying means being adapted to pass electrical voltage fluctuations which are generated cross said resistance element by flame impinging directly thereon, and detecting means connected to the output terminals of said amplifying means.

5. Flame detecting apparatus comprising, in combination, an electrode having a ceramic sheath disposed thereabout positioned directly in the region of flame to be detected, an amplifier adapted to pass fluctuating voltages, one input terminal of said amplifier being connected to said electrode and the second input terminal of said amplifier being connected to a point of reference potential, and means connected to the output terminals of said amplifier to detect the fluctuating voltages which are generated between said electrode and said point of reference potential by the action of flame in the region of said electrode.

6. Flame detecting apparatus comprising, in combination, pairs of spaced electrodes, at least one of which is positioned directly in the region of flame to be detected, an electrical resistance element disposed between said pair of electrodes, said resistance element being formed of a ceramic material having a negative coefficient of thermal resistivity, an amplifier adapted to pass fluctuating voltages, the input terminals of said amplifier being connected to respective ones of said electrodes, and means connected to the output terminals of said amplifier for detecting the fluctuating voltages generated between said electrodes by the presence of the flame being detected.

7 Apparatus to detect an ion producing chemical reaction comprising an electrically conductive ceramic resistance element adapted to be positioned directly within the region of the reaction to be detected, a first amplifier adapted to pass fluctuating voltage signals, the input terminals of said first amplifier being connected to respective end terminals of said resistance element, a first capacitor having one terminal thereof connected to the first output terminal of said first amplifier, a unidirectional current conducting element having one terminal thereof connected to the second terminal of said first capacitor, a second amplifier, the second terminal of said conducting element being connected to the first input terminal of said second amplifier, means connecting the second output terminal of said first amplifier to the second input terminal of said second amplifier, a first resistor having one terminal thereof connected to the second terminal of said first capacitor, the second terminal of said first resistor being connected to the second output terminal of said first amplifier, a second resistor having one terminal thereof connected to the first input terminal of said second amplifier, the second terminal of said second resistor being connected to the second input terminal of said second amplifier, a second capacitor connected in parallel with said second resistor, and current indicating means connected to the output terminals of said second amplifier.

References Cited in the file of this patent

UNITED STATES PATENTS

| | | |
|---|---|---|
| 824,638 | De Forest | June 26, 1906 |
| 1,127,424 | Ferra | Feb. 9, 1915 |
| 2,316,872 | Kernen | Apr. 20, 1943 |
| 2,491,445 | Cunningham et al | Dec. 13, 1949 |
| 2,492,493 | Misson | Dec. 27, 1949 |
| 2,688,648 | McIlvaine | Sept. 7, 1954 |

FOREIGN PATENTS

| | | |
|---|---|---|
| 577,109 | Great Britain | May 6, 1946 |

OTHER REFERENCES

Terman: Radio Engineering, first edition (1932), pp. 208–210.

Physical Review, vol. 74, No. 11, December 1, 1948, pp. 1714–1719, article by Cook et al.

The Review of Scientific Instruments, vol. 20, No. 11, November 1949, pp. 785–794, article by Garrison et al.

UNITED STATES PATENT OFFICE
CERTIFICATE OF CORRECTION

Patent No. 2,847,643                                                 August 12, 1958

Deslonde R. de Boisblanc

It is hereby certified that error appears in the printed specification of the above numbered patent requiring correction and that the said Letters Patent should read as corrected below.

Column 1, line 19, for "For some time is generally" read -- For some time it generally --; column 3, line 46, for "shown s" read -- shown as --; column 5, line 27, for "pairs" read -- a pair --.

Signed and sealed this 23rd day of December 1958.

(SEAL)

Attest:
KARL H. AXLINE
Attesting Officer

ROBERT C. WATSON
Commissioner of Patents